United States Patent
Zinn

(10) Patent No.: US 8,209,613 B2
(45) Date of Patent: Jun. 26, 2012

(54) METHOD AND DEVICE FOR SCHEDULING FOLLOW-UP EVENTS

(75) Inventor: Scotte Zinn, Waterloo (CA)

(73) Assignee: Research In Motion Limited, Waterloo (CA)

(*) Notice: Subject to any disclaimer, the term of this patent is extended or adjusted under 35 U.S.C. 154(b) by 353 days.

(21) Appl. No.: 11/566,769

(22) Filed: Dec. 5, 2006

(65) Prior Publication Data

US 2008/0134041 A1  Jun. 5, 2008

(51) Int. Cl.
*G06F 3/00* (2006.01)
(52) U.S. Cl. ......... 715/733; 715/963; 715/864; 715/780
(58) Field of Classification Search .................. 715/963, 715/733, 864, 780; 707/104.1; 705/8, 9
See application file for complete search history.

(56) References Cited

U.S. PATENT DOCUMENTS

| | | | | |
|---|---|---|---|---|
| 5,999,938 A | * | 12/1999 | Bliss et al. .............................. | 1/1 |
| 6,208,996 B1 | * | 3/2001 | Ben-Shachar et al. ................ | 1/1 |
| 6,232,970 B1 | * | 5/2001 | Bodnar et al. ................ | 715/708 |
| 7,149,810 B1 | * | 12/2006 | Miller et al. ................... | 709/246 |
| 2003/0120516 A1 | * | 6/2003 | Perednia ............................ | 705/3 |
| 2006/0015533 A1 | * | 1/2006 | Wolf et al. ................. | 707/104.1 |

FOREIGN PATENT DOCUMENTS

| | | |
|---|---|---|
| EP | 1271367 | 1/2003 |
| EP | 1603301 | 12/2005 |
| WO | WO0120409 | 3/2001 |

OTHER PUBLICATIONS

Developer One: "Power Calendar for Smartphone" [Online] 2005, XP002435711.
http:/www.act.com/products/mobile/palm.
Examiners Report dated Jan. 31, 2012 from the Canadian Patent Office for corresponding Canadian Patent Application No. 2,613,431.
The KOrganizer Handbook—Website: Copyright 2000 Milos Prudeck, Copyright 2001 Paul E. Ahlquist, Jr., Copyright 2004 Jurgen Nagel, Copyright 2005 Carlos Leonhard Woetz.

* cited by examiner

*Primary Examiner* — Chat Do
*Assistant Examiner* — Andrea Leggett
(74) *Attorney, Agent, or Firm* — Ridout & Maybee LLP

(57) ABSTRACT

A device and method for scheduling follow-up events in relation to an existing event record. The device receives an input follow-up request associated with the existing event record and automatically generates a follow-up event record having information in its field populated using the information contained in the existing event record. The date of the follow-up event is automatically generated based upon the date of the existing event record. If the existing event record is a recurring event, then the date of the follow-up event is based on the frequency of recurrence. The follow-up event record may be displayed for user editing and may be transmitted to the attendees to propose scheduling of the follow-up event.

17 Claims, 6 Drawing Sheets

METHOD AND DEVICE FOR SCHEDULING FOLLOW-UP EVENTS

FIELD

Example embodiments described herein relate to communications devices and, in particular, to methods and systems for scheduling follow-up events on such devices.

BACKGROUND

Communications devices, for example handheld mobile communications devices, may be used to facilitate communications over a network. A common feature of such communications devices is a system or application for scheduling events and setting reminders, i.e. a built-in calendar or events scheduler.

Users of such devices may wish to schedule an event, such as a meeting, by sending a meeting request to other communications devices to be accepted by users of those devices. Before, during, or after a scheduled event, it is sometimes decided that a follow-up event is required, for example to finish incomplete business or to discuss the matter at hand in more detail. It may be cumbersome to set up the follow-up event, for example by creating a new meeting request, because it is difficult and inconvenient to do so (particularly on handheld mobile communications device).

In some circumstances, the same attendees may have scheduled recurring meetings, for example once a month for each and every month. One of the attendees may wish to schedule a follow-up meeting to occur before the next scheduled meeting.

Creating an event, for example a follow-up meeting, typically involves individually entering or selecting all of the recipients of the message or message thread as attendees, entering the date of the meeting, and entering the subject and notes, such as the content of the message or details about the meeting. This can be cumbersome and time-consuming and may lead to errors in the list of attendees, the date, subject and notes.

It would be advantageous to provide for a method and device that improves upon the scheduling of follow-up meetings.

BRIEF DESCRIPTION OF THE DRAWINGS

Example embodiments will now be described by way of example with reference to the accompanying drawings, through which like reference numerals are used to indicate similar features.

DETAILED DESCRIPTION

Figure 1:
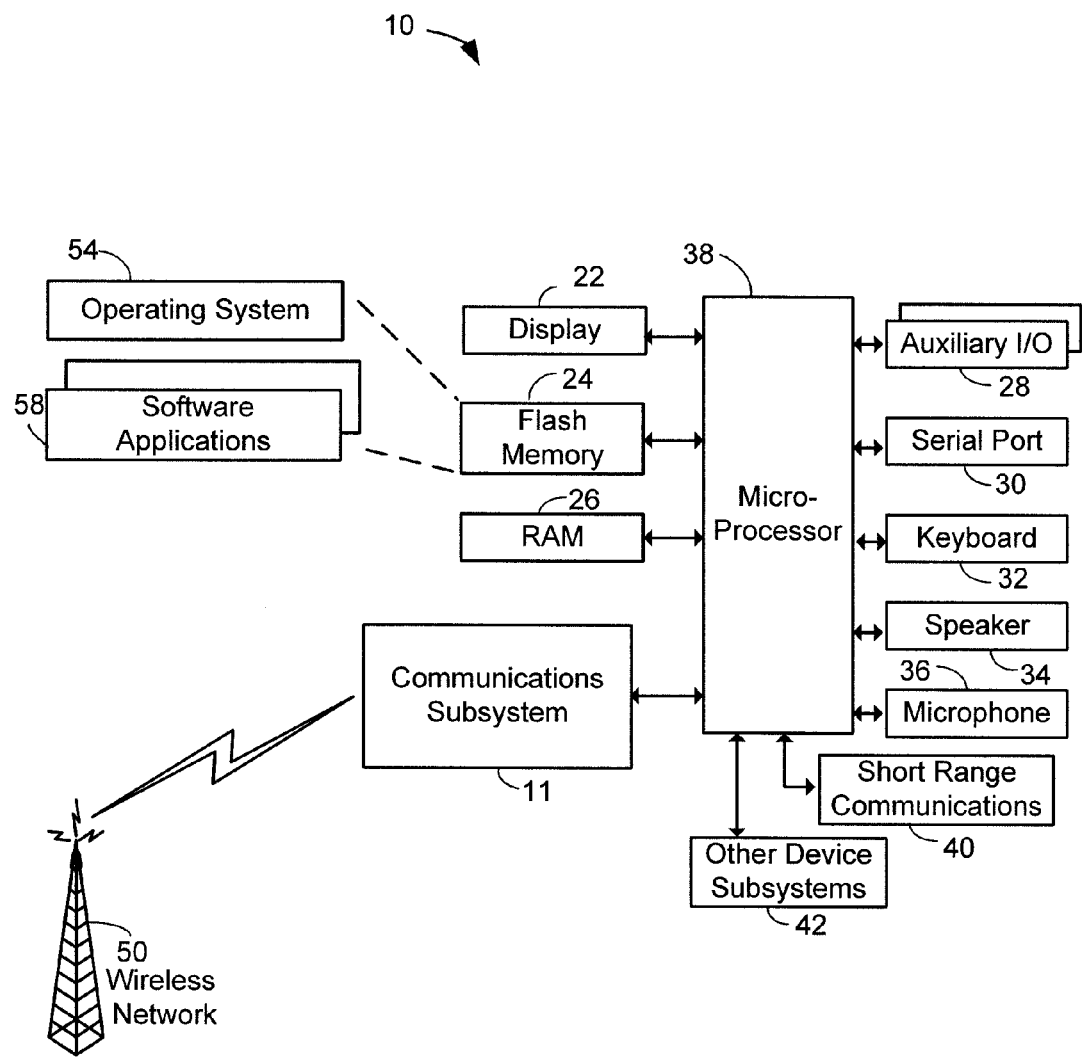
FIG. 1 shows a block diagram of an example of a mobile communications device to which example embodiments of an event scheduler can be applied.

In one aspect, the present application provides a method for scheduling a future event on a device connected to a network, the device having stored thereon an existing event record, the existing event record having at least date information and subject information. The method includes steps of receiving a request to schedule a follow-up event in relation to the existing event record, creating a follow-up event record, the follow-up event record having a plurality of fields, including a subject field and a date field, and extracting subject information from the existing event record and populating the subject field with the extracted subject information. The method also includes determining whether the existing event record comprises an occurrence of a recurring event having a frequency of recurrence and, if so, selecting a follow-up date based upon the frequency of recurrence, and if not, selecting a follow-up date based upon a default interval. The method further includes steps of populating the date field with the selected follow-up date, and displaying the follow-up event record in a user interface.

In another aspect, the present invention provides a communications device. The device includes a memory storing an existing event record, the existing event record having at least date information and subject information. The device further includes a display, a user input device, a communications subsystem for communicating with remote devices over a network, and a processor for receiving input from the user input device and for controlling the display. The device also includes an event scheduler executable by the processor and configured to receive a request to schedule a follow-up event in relation to the existing event record, and create a follow-up event record, the follow-up event record having a plurality of fields, including a subject field and a date field. The event scheduler is also configured to extract subject information from the existing event record and populate the subject field with the extracted subject information, and determine whether the existing event record comprises an occurrence of a recurring event having a frequency of recurrence and, if so, select a follow-up date based upon the frequency of recurrence, and if not, select a follow-up date based upon a default interval. The event scheduler is further configured to populate the date field with the selected follow-up date. The display is configured to display the follow-up event record in a user interface.

In yet another aspect, the present invention provides a computer program product comprising a computer-readable medium having encoded thereon computer program instructions for scheduling a future event on a device connected to a network, the device having stored thereon an existing event record, the existing event record having at least date information and subject information. The computer executable instructions include instructions for receiving a request to schedule a follow-up event in relation to the existing event record, and creating a follow-up event record, the follow-up event record having a plurality of fields, including a subject field and a date field. They include instructions for extracting subject information from the existing event record and populating the subject field with the extracted subject information. They further include instructions for determining whether the existing event record comprises an occurrence of a recurring event having a frequency of recurrence and, if so, selecting a follow-up date based upon the frequency of recurrence, and if not, selecting a follow-up date based upon a default interval. The computer executable instructions also include instructions for populating the date field with the selected follow-up date, and displaying the follow-up event record in a user interface.

At least one example embodiment includes a method for scheduling a future event on a computer device connected to a network, the computer device having a previously stored event stored thereon. The steps include extracting date information from the previously stored event at the computer device, displaying on a display of the computer device an event scheduling interface for scheduling a future event, the event scheduling interface having a plurality of input fields for receiving information about the future event, the plurality of input fields including an attendee input field and a date input field, populating the attendee input field with attendee information from the previously stored event, determining whether the extracted date information includes information on an interval of recurrence, and if so generating in the computer device a future date in dependence on the interval of recurrence, and if not generating in the computer device a future date of a default duration, and populating the date input field with the future date.

At least one example embodiment includes a communications device configured for connection to a network, the communications device having a previously stored event stored thereon. The device includes a display, a user input device, and a scheduling module. The scheduling module is configured for displaying on the display an event scheduling interface for scheduling a future event, the event scheduling interface having a plurality of input fields for receiving information about the future event, the plurality of input fields including an attendee input field and a date input field. The scheduling module is configured for populating the attendee input field with attendee information from the previously stored event and for populating the date input field with a future date in dependence on the extracted date information.

At least one example embodiment includes a communications device configured for connection to a network, the communications device having a previously stored event stored thereon. The device includes a display, a user input device, and a scheduling module. The scheduling module is configured for displaying on the display a menu having a user selectable icon for scheduling a future event, whereupon selection of the icon displays an event scheduling interface, the event scheduling interface having a plurality of input fields for receiving information about the future event, the plurality of input fields including an attendee input field and a date input field. The scheduling module is configured for populating the attendee input field with attendee information from the previously stored event and for populating the date input field with a future date in dependence on the previously stored event.

The terms "include" and "comprise" are used interchangeably within this document and are non-exhaustive when used, meaning, for example, that elements and items that are identified as including or comprising certain components or features can also include additional components or features that are not expressly identified.

The following description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions, and other devices.

Referring now to the drawings, FIG. 1 is a block diagram showing an example of an electronic communications device 10 to which example embodiments of the event scheduler described herein can be applied. The communications device 10 is a two-way mobile communication device having voice and messaging communications capabilities. Depending on the functionality provided by the device 10, in various embodiments the device 10 may be a data communication device, a multiple-mode communication device configured for both data and voice communication, a mobile telephone, a PDA enabled for wireless communication, a computer system with a wireless modem or wireless network card, or a computer or phone device with a fixed connection to a network, among other things. The device 10 may be a handheld device.

In the example embodiment shown in FIG. 1, the device 10 includes a communication subsystem 11. The communication subsystem 11 may include one or more receivers, transmitters, and associated components such as one or more antenna elements, and a processing module such as a digital signal processor (DSP). As will be apparent to those skilled in the field of communications, the particular design of the communication subsystem 11 will be dependent upon the communication network(s) in which the device 10 is intended to operate.

Signals received by the device 10 from a wireless communication network 50 are input to the receiver of the communication subsystem 11, which may perform such common receiver functions as signal amplification, frequency down conversion, filtering, channel selection and the like. In a similar manner, signals to be transmitted are processed, including modulation and encoding for example, by the DSP and input to the transmitter for digital to analog conversion, frequency up conversion, filtering, amplification and transmission over the wireless communication network 50.

The device 10 includes a microprocessor 38 that controls the overall operation of the device. The microprocessor 38 interacts with the communications subsystem 11 and also interacts with further device subsystems such as a display 22, flash memory 24, random access memory (RAM) 26, one or more auxiliary input/output (I/O) subsystems or devices 28 (e.g. a thumbwheel 28*a*), serial port 30, keyboard or keypad 32, speaker 34, microphone 36, a short-range communications subsystem 40, and any other device subsystems generally designated as 42.

Figure 2:
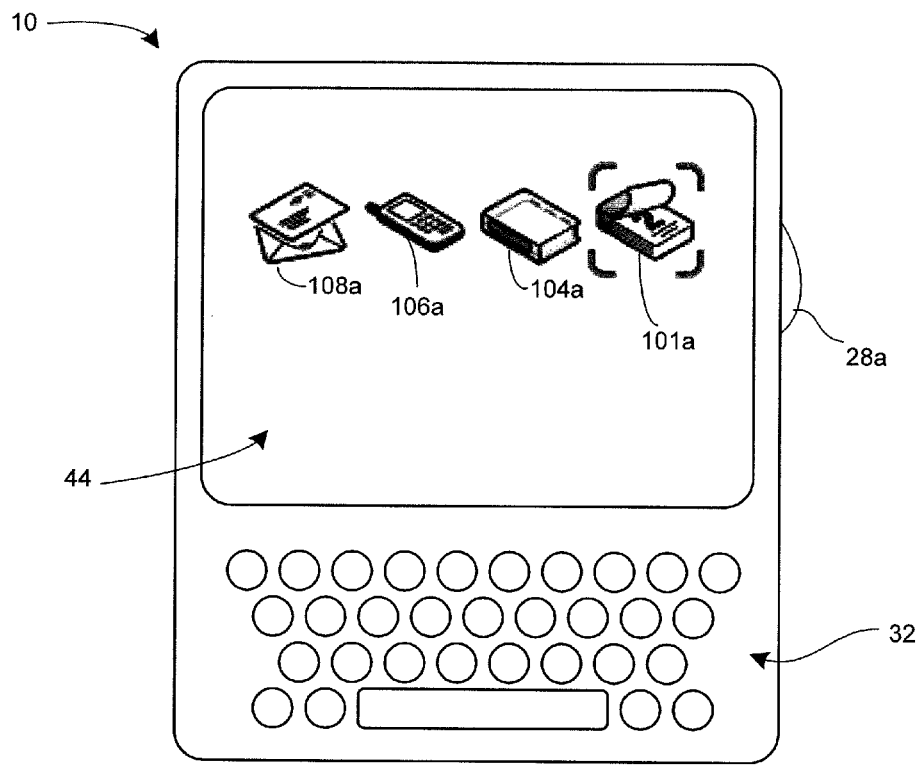
FIG. 2 shows, in diagrammatic form, a front view of an example of the device of FIG. 1.

FIG. 2 shows, in diagrammatic form, a front view of an example handheld embodiment of the device 10 of FIG. 1. The device 10 includes a display screen 44 of the display 22, alphanumeric keyboard or keypad 32 and thumbwheel 28*a*. In some example embodiments, thumbwheel 28*a* may also be selectively depressed by a user to select a given option on an interface displayed on the screen 44 or to display additional menu options on the interface, where applicable. In another embodiment, thumbwheel 28*a* may be trackball or similar input device.

Referring again to FIG. 1, operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, in example embodiments enables execution of software applications 58 on the device. A predetermined set of software applications 58 which control basic device operations, including data and voice communication applications for example, will normally be installed on the device 10 during manufacture. Further software applications 58 may also be loaded onto the device 10 through the wireless communication network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which further process the received signal for output to the display 22 through the graphics subsystem 44, or alternatively to an auxiliary I/O device 28. A user of device 10 may also compose data items within a software application 58, such as email messages and calendar entries for example, using the keyboard 32 in conjunction with the display 22 and possibly an auxiliary I/O device 28 (e.g. the thumbwheel 28*a*). Such composed items may then be transmitted and received over a communication network through the communication subsystem 11.

The serial port 30 (which may be for example a universal serial bus (USB) port) in FIG. 1 may enable a user to set preferences through an external device or software application and would extend the capabilities of the device by providing for information or software downloads to the device 10 other than through a wireless communication network.

The short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless communication network 50 is, in an example embodiment, a wireless wide area packet data network, (e.g. Mobitex™ or DataTAC™), which provides radio coverage to mobile devices 10. Wireless communication network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some example embodiments, network 50 is a wireless local area network (WLAN), such as for example a network compliant with one or more of the IEEE 802.11 family of standards. In some example embodiments, the device 10 is configured to communicate in both data and voice modes over both wireless WAN and WLAN networks and to roam between such networks.

Figure 3:
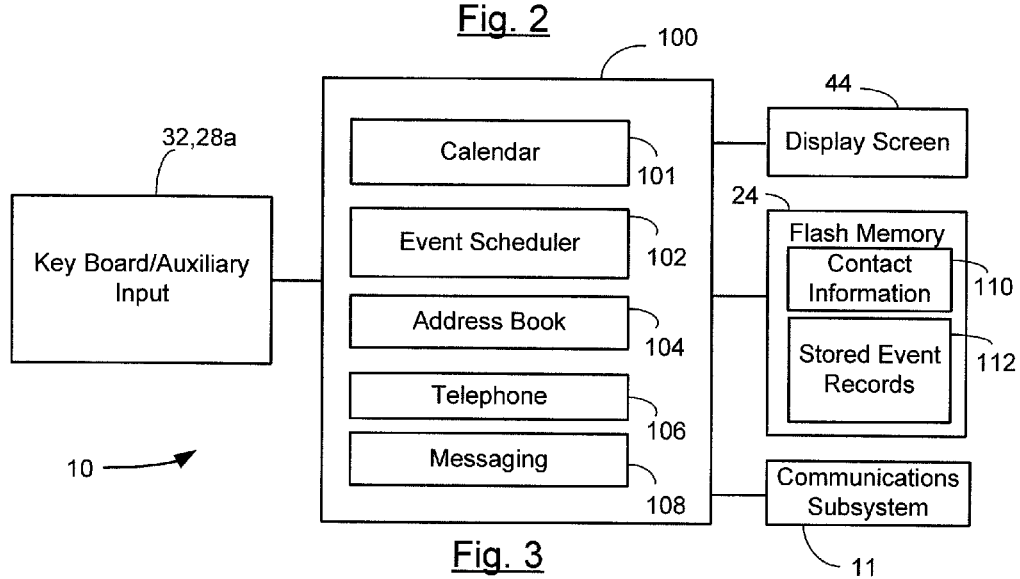
FIG. 3 shows a further operational block diagram representation of the mobile communications device of FIG. 1.

FIG. 3 shows a further operational block diagram representation of the mobile communications device of FIG. 1. Under instructions from various software applications 58 resident on the device 10, the processor 38 is configured to implement various functional components or modules 100, some of which are represented in FIG. 3, for interacting with the device subsystems described above. In an example embodiment, the software resident on the device 10 includes applications for implementing a calendar 101, an event scheduler 102, an address book 104, a telephone 106, and a messaging module 108. In some embodiments, some or part of the functionality of the functional modules 100 can be implemented through firmware or hardware components instead of, or in combination with, computer software instructions executed by the microprocessor 38 (or other processors).

In some example embodiments, as shown in FIG. 3, the memory 24 includes a stored contact information database 110, for example for storage of addressee contact information. The stored event records 112 stores the event information. The event information may then be stored or accessed by one of the modules.

The event scheduler 102 is provided for facilitating the scheduling of events, as will be explained in greater detail below. The messaging module 108 enables the device 10 to send and receive messages, such as email messages, over one or more wireless networks 50.

It should be noted that the term "message" is used to designate any type of electronic message such as an email (which may include a thread of emails), text or SMS message, instant message, etc. The term "event" is used to designate any type of event, such as an appointment, a meeting, a conference call, a scheduled task, etc.

The event scheduler 102 may be implemented as part of an electronic messaging application, such as the messaging module 108 or as part of a general event scheduling application, such as the calendar 101. Alternatively, the event scheduler 102 may be implemented as an independent application that communicates with an electronic messaging application and/or a general event scheduling application. The use of calendar applications and electronic messaging applications on PDA-type devices and personal computers to schedule appointments, meetings and the like is common place.

The address book 104 enables contact information, such as telephone numbers, personal identification numbers (PIN), and email and/or instant text messaging addresses, to be stored and accessed on the device 10. As mentioned above, such contact information may be stored in memory 24, within a contact information database 110. The messaging module 108 enables the device 10 to transmit and receive messages over one or more wireless networks 50. In some embodiments, PIN messages may be sent directly from one electronics communications device to another without passing through an employer company's server.

With reference also to FIG. 2, in at least some example embodiments, the modules 100 each have an associated selectable icon that is displayed on the screen 44 as part of a graphical user interface. For example, FIG. 2 shows an icon 101*a* for the calendar 101, an icon 104*a* for the address book 104, an icon 106*a* for the phone 106 and an icon 108*a* for the electronic messaging 108.

According to example embodiments of the invention, the event scheduler 102 permits a user of the device 10 to set up or schedule an event or event request with other users having communication devices. In some example embodiments, the event scheduler 102 may be used to create a follow-up event of an existing meeting, as will be described in more detail below.

Figure 4:
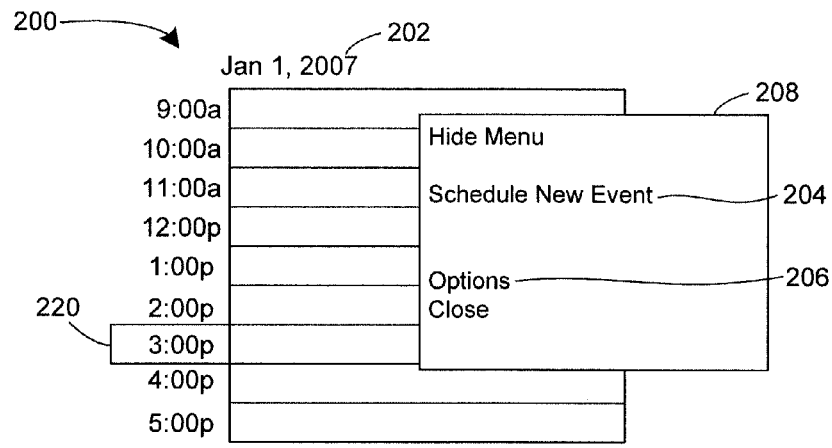
FIG. 4 shows a diagrammatic view of an example graphical user interface screen for a calendar application.

In this regard, reference is now made to FIG. 4 which shows, in diagrammatic form, an example graphical user interface 200 of a calendar application. The interface 200 includes a date field 202, a cursor 220, and an additional menu 208 having user selectable options, including schedule new event item 204 and options item 206. In some example embodiments, the additional menu 208 may be generated in response to a depression of thumbwheel 28a or any other suitable user input.

Figure 5:
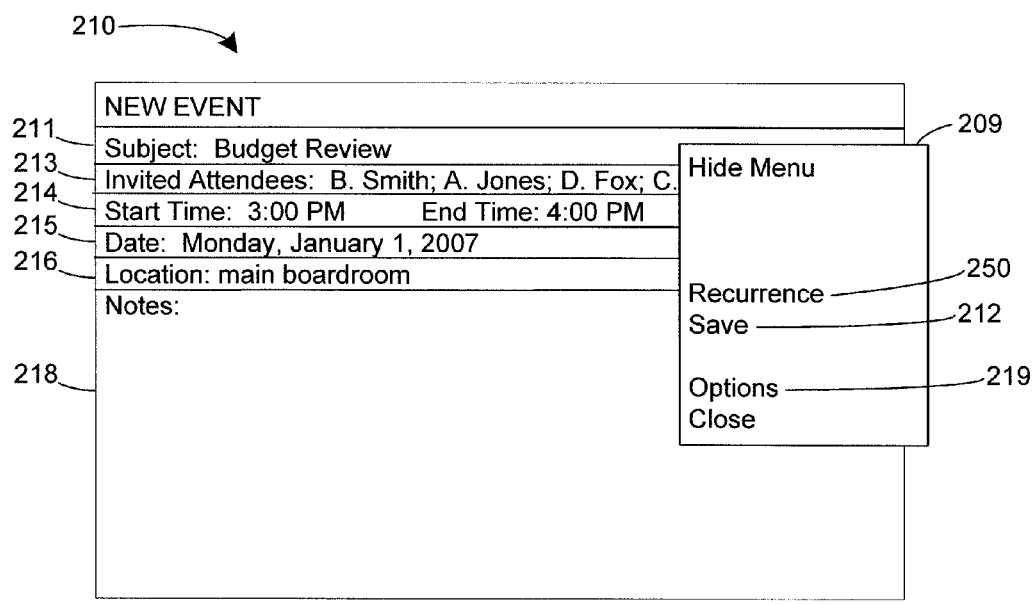
FIG. 5 shows a diagrammatic view of a graphical user interface screen for creating a new event in an example embodiment.
Figure 6:
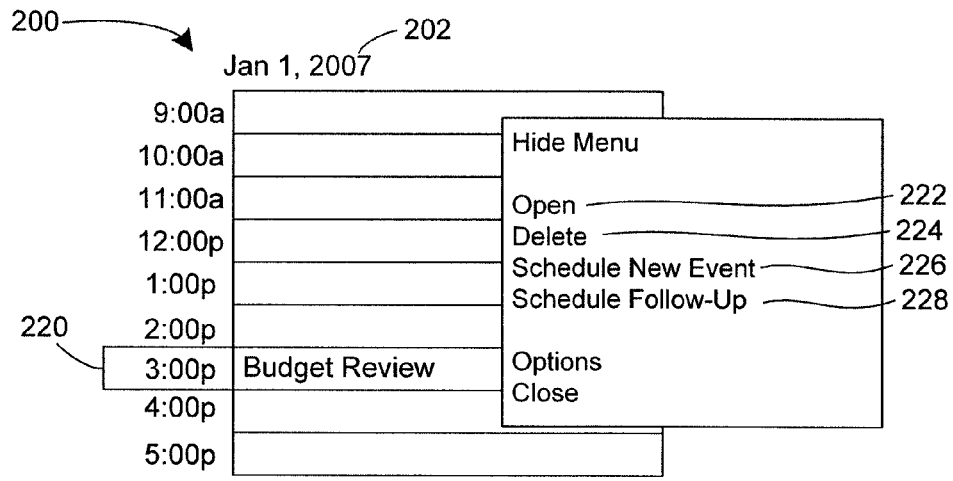
FIG. 6 shows another diagrammatic view of an example graphical user interface screen for a calendar application with an additional menu field for scheduling follow-up meetings.
Figure 7:
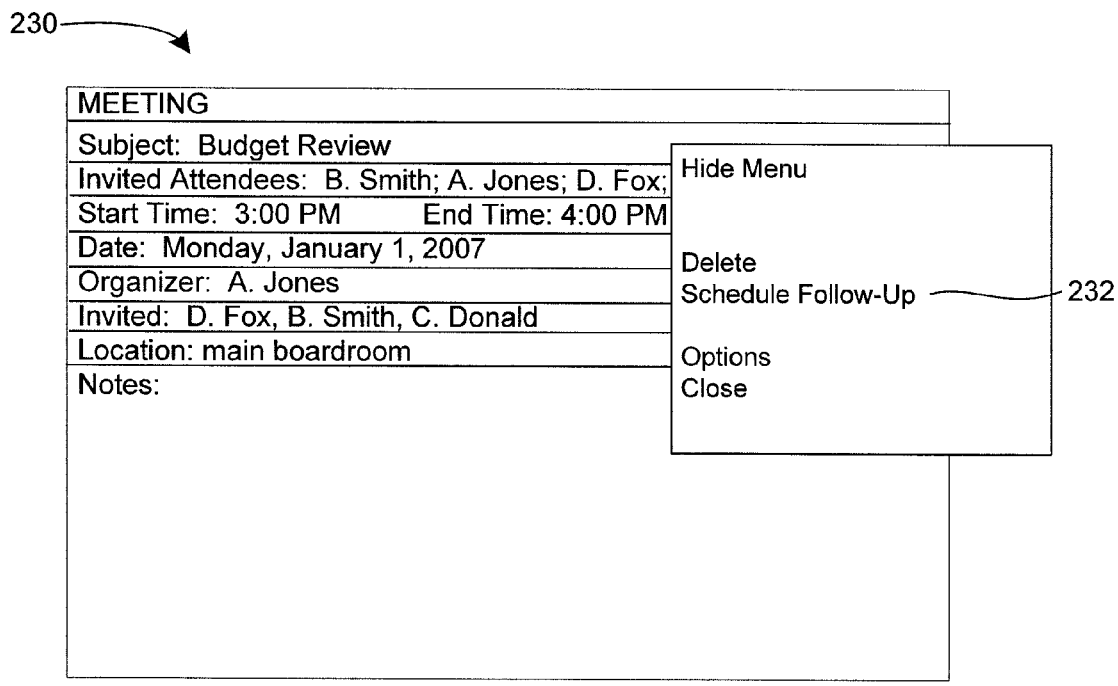
FIG. 7 shows a diagrammatic view of a user interface screen for viewing a scheduled event.
Figure 8:
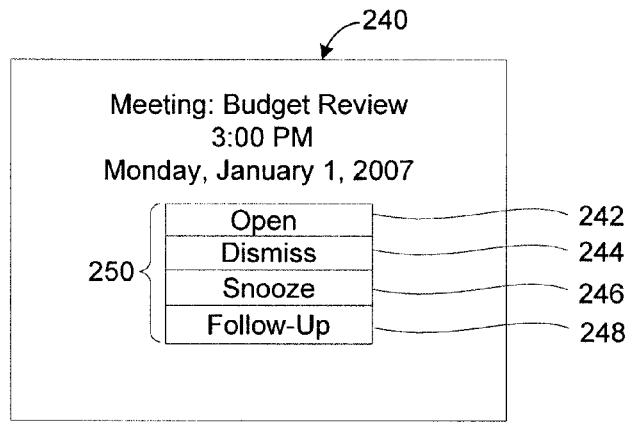
FIG. 8 shows a diagrammatic view of a reminder screen generated on the communications device in an example embodiment.
Figure 9:
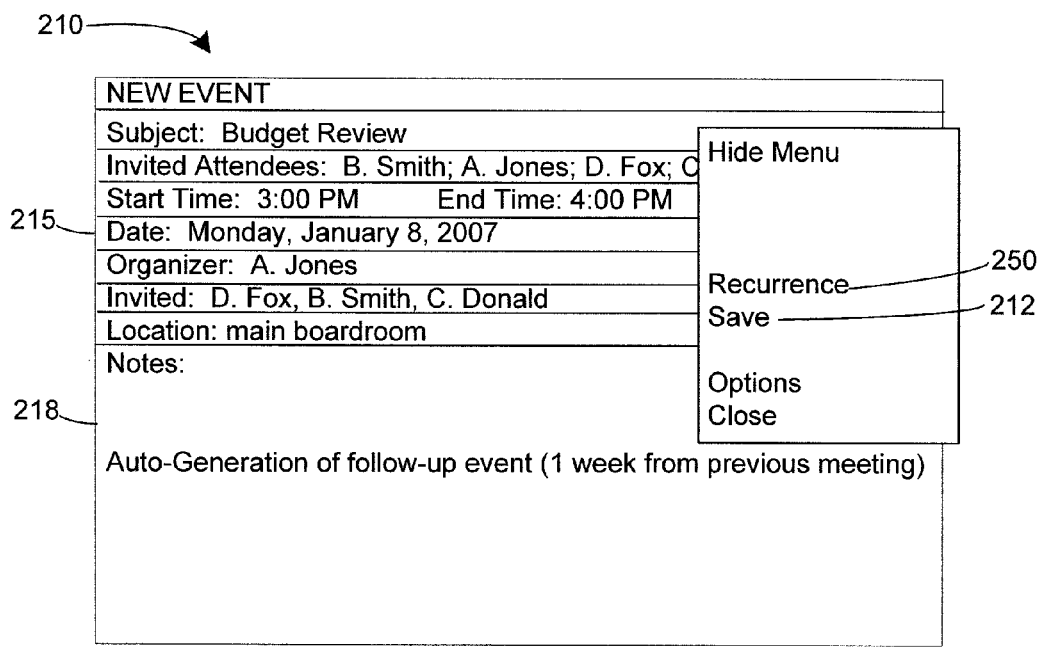
FIG. 9 shows a diagrammatic view of a user interface screen for creating a new event with a meeting date field auto-generated.

FIG. 5 shows a diagrammatic view of a graphical user interface screen 210 for creating a new event in an example embodiment. FIG. 6 shows another diagrammatic view of an example graphical user interface screen 200 for a calendar application with an additional menu field for scheduling follow-up meetings. FIG. 7 shows a diagrammatic view of a user interface screen 230 for viewing a scheduled event. FIG. 8 shows a diagrammatic view of a reminder screen 240 generated on the communications device in an example embodiment. FIG. 9 shows a diagrammatic view of a user interface screen 210 for creating a new event with a meeting date field auto-generated.

Selection of the "Schedule New Event" item 204 (FIG. 4) generates a new event scheduling interface 210 on display screen 44, as shown in FIG. 5, for scheduling of a new future event. This new event scheduling interface 210 includes a number of fields for inputting information about the future event, such as a subject field 211, an invited attendee field 213, an event time field 214, an event date field 215, an event location field 216, and a notes field 218. In some example embodiments, a user may populate the fields of the new event scheduling interface 210 by selecting the appropriate field and typing in the relevant information, for example using keyboard 32 and/or an auxiliary input device such as thumbwheel 28a. Once a user confirms the content of the fields of the event scheduling interface 210, a corresponding event record 112 (FIG. 3) is stored in the flash memory 24 and, as will be described further below, an event notification may be transmitted to attendees.

In at least some example embodiments, the invited attendees field 213 may be selectively populated with the attendee information stored in address book 104, for example e-mail addresses. In some example embodiments, the attendees field 213 may be populated by typing in the appropriate attendee information (such as e-mail, personal identification number (PIN), etc.) using the keyboard 32. Alternatively, the user may enter additional attendee names manually and these names will be automatically associated with their address/phone number, as stored in address book 104. In some embodiments, the stored contact information database 110 is stored locally in a storage such as flash memory 24 of the device and periodically synchronized with an address book maintained at a personal computer of the user. In other embodiments, the stored contact information may be retrieved from a remote server or computer over wireless network 50 as part of the lookup function.

In at least some example embodiments, referring again to FIG. 5, the user may select the event to be a recurring event by selecting the recurrence item 250 from a menu. For example, an event may be scheduled to recur on a daily, weekly, monthly, or annual basis. In such example embodiments, upon selection of the recurrence item 250, the screen 44 will display a sub-menu (not shown), displaying to the user a number of selectable options, for example "none", "daily", "weekly", "monthly", and "yearly". Selection of "none" would mean that the event is not a recurring event. In some example embodiments, a user may configure the recurring of the event by selecting the options item 219 in the additional menu.

Once the user is satisfied with the information included in the new event scheduling interface 210, the user can select a "save" item 212 from the menu 209, which in an example embodiment (i) causes the information in the fields of the interface 210 to be saved as the stored event record 112 in a storage of or accessible to the mobile device 10; and (ii) causes the messaging module 108 to send an electronic event notification that includes at least some of the information contained in the fields of the event scheduler interface 210 to the listed invited attendees. Once the information has been saved, the new event will appear as a calendar entry (FIG. 6) for the date 202 (which corresponds to the date shown in date field 215), which can be called up for viewing and, in some cases, editing or cancellation. In an example embodiment, the sent electronic event notification is sent to the invitees as a meeting request, whereby each of the recipients will be able to either accept or decline the event. In such an embodiment, the new event may appear as a calendar entry for each attendee in a manner similar to user interface 200 (FIG. 6), for example displayed in the user's respective communications device.

If the user has selected the scheduled event to be a recurring event, the scheduled event will appear as a calendar entry (FIG. 6) for each applicable date 202 (and any applicable subsequent dates).

In some example embodiments, at least one of the attendees may wish to request a follow-up event to a scheduled event, for example to finish incomplete business or to discuss the matter at hand in more detail. In some example embodiments, with reference to FIG. 6, a user may highlight the scheduled event on the calendar using the cursor 220. In some example embodiments, the selection of a scheduled event will cause the device 10 to display an additional menu, providing a number of user selectable menu items. These menu items may include an open item 222, a delete item 224, a schedule new event item 226, and a schedule follow-up item 228. Selection of the open item 222 causes the device 10 to display, for example, a graphical user interface 230 for viewing a scheduled event (FIG. 7). Referring still to FIG. 6, selection of the delete item 224 will delete the scheduled event. Selection of the schedule new event item 226 will display a new event scheduling interface 210 on display screen 44, for example as shown in FIG. 5, for scheduling of a new future event. The interface 210 may or may not have at least one of the fields automatically populated by the event scheduler 102.

Referring again to FIG. 6, a user may select the schedule follow-up item 228. In some example embodiments, this results in the display screen 44 displaying a new event graphical user interface 210, for example as shown in FIG. 9. In some example embodiments, the event scheduler 102 will automatically populate the fields of the new event scheduling interface 500 in dependence on information extracted from the original scheduled event. In other words, the event scheduler 102 will copy the appropriate data from the original scheduled event into the new event graphical user interface 210. For example, information from the subject 211, list of attendees 213, the start time 214, the location 216, and the notes 218 may be defaulted to be the same as the original scheduled event. The event scheduler 102 may also populate the date field 215 with a suitable default date for the follow-up meeting, for example one week after the original scheduled event. In the example embodiment shown, the date field 215 is automatically populated with Jan. 8, 2007 (FIG. 9), which is one week after the original scheduled event of Jan. 1, 2007 (FIG. 5). If the user is not satisfied with the automatically populated date, the user may simply scroll to the date field 215 and change the date. The user may also edit some or all of the other fields in the interface 210, for example to change the attendees, location, etc. Once the user is satisfied with the information included in the new event scheduling interface 210, the user can select the "save" item 212 from the menu, to store the event and/or send an event notification to the attendees, as previously described above.

In other example embodiments, when the user selects the schedule follow-up item 228, the event scheduler 102 automatically creates a follow-up event and sends an event notification to the attendees. The event scheduler 102 may select a suitable default date and may send the proposed event to the attendees with little or no further user intervention. Accordingly, this option allows a user to generate a follow-up meeting using only a few commands. This option may be turned on or preconfigured by a user via an options menu. This option may also be a stand-alone icon shown on the interface, for example as a "quick follow-up" icon or button (not shown).

Referring again to FIG. 9, in some example embodiments, the notes field 218 may be automatically populated to inform the user that a follow-up event has been scheduled. In the example embodiment shown, the notes field 218 displays "Auto-Generation of follow-up event (1 week from previous meeting)". Accordingly, the user is advised that the follow-up date has been automatically generated. A user may still edit the notes field 218, before selecting the "save" item 212.

It will be appreciated by those skilled in the art that the desired date of the follow-up event may vary depending on the situation. In some example embodiments, the follow-up event may be scheduled for the next day, next week, next month, next year, etc. In some example embodiments, a default number of days may be pre-configured by the user, for example using an options menu.

In some example embodiments, if the default date for the follow-up event falls on a weekend, for example a Saturday, the event scheduler 102 will automatically select the next appropriate day, for example a Monday (or a Tuesday if the Monday is a holiday).

In some example embodiments, the scheduled event may be an occurrence of a recurring series of events. In such embodiments, the date of the follow-up event may vary depending on the interval of the recurrence. By way of example only, if the interval of the recurrence is weekly, then the default date of the follow-up event may, for example, be the next day. If the interval of the recurrence is monthly, then the default date of the follow-up event may, for example, be the next week. If the interval of the recurrence is yearly, then the default date of the follow-up event may, for example, be the next week or month. In some example embodiments, if the interval of the recurrence is daily, then the follow-up may not be an available option. In other example embodiments, the default date of the follow-up event may for example be the next appropriate time slot, for example after 1 hour. In such an embodiment, a high priority indicator may also accompany the scheduling request. In some example embodiments, the default date of the follow-up event depending on the recurrence may be pre-configured by the user, for example using an options menu.

In yet other embodiments, the follow-up date may be initially based upon a default date as explained above, but may be automatically altered based upon the schedules of the attendees. For example, the event scheduler may retrieve schedule information for each attendee over the network and may compare the schedules to identify a suitable time and/or date. Each of the schedules retrieved by the event scheduler may indicate times during which an attendee is available and times during which the attendee is unavailable. The retrieved schedules need not necessarily reveal the details of events in the attendee's schedules, since the attendee may not wish to reveal the details of his or her schedule. The event scheduler may choose a follow-up date as the next date following the default date during which each of the attendees is available during the default timeslot. In another embodiment, the event scheduler may further select a suitable timeslot as the next sufficiently long timeslot during which none of the attendees is occupied and which occurs no sooner than the default date. Other variations will be appreciated.

In some example embodiments, a device 10 may have other menus having user selectable options for scheduling follow-up events. In some example embodiments, the selection of the open item 222 (FIG. 6) will result in the user interface 230, as illustrated in FIG. 7, displaying the scheduled event to the user. As shown, the scheduled event includes at least some of the same fields as generated in the user interface 210 (FIG. 5). In some example embodiments, the user interface 230 may display an additional menu with user selectable options. As shown in FIG. 7, one of the selectable options may include a schedule follow-up item 232. In some example embodiments, upon selection of the schedule follow-up item 232, the screen 44 will display an interface similar to user interface 210 (FIG. 9) for automatically generating the follow-up event, as described above.

In some example embodiments, referring now to FIG. 8, the event scheduler 102 and/or calendar 101 will generally attempt to generate a prompt or reminder at the time and date set in the time and date fields 215 and 214, respectively. In some example embodiments, the user may configure the event scheduler 102 such that a reminder is generated at a user-defined duration prior to the scheduled event.

For example, when the time for a scheduled event occurs, the event scheduler 102 and/or calendar 101 causes an event reminder dialog box to be displayed on screen 44. An example of such an event reminder dialog box 240 is shown in FIG. 8 comprising a plurality of buttons 250. The plurality of buttons 250 comprises a open button 242 (designated by "Open") for viewing the details of the scheduled event in an interface screen similar to the graphical user interface screen 230 (FIG. 7), a defer button 246 (designated by "Snooze") for deferring the reminder to a new time and date, a dismiss button 244 (designated by "Dismiss") for dismissing the reminder, and a schedule follow-up button 248 (designated by "Follow-up"). In some example embodiments, upon selection of the schedule follow-up button 248, the screen 44 will display a screen similar to the user interface 210 (FIG. 9) for automatically generating the follow-up event, as described above.

The above-listed names for each of the plurality of buttons 250 are intended as examples, and the skilled person will understand that any reasonable name could be used. Accordingly, any suitable combination of buttons may be used. In some embodiments, the plurality of buttons may be replaced with any suitable user interface. In some embodiments, if the device 10 is turned off when the scheduled time occurs, the reminder dialog box 240 is displayed the next time the device is activated. Similarly, in some embodiments, if the device 10 is in a locked or inactive state when the scheduled time occurs, the reminder dialog box 240 is displayed when the user next unlocks or activates the device.

The user may select one of the plurality of buttons displayed in dialog box 240 using an auxiliary I/O device 28 such as, for example, the thumbwheel 28a, or the keyboard 32 in conjunction with the display 22.

If the user selects the open button 242, the device 10 will display the details of the event in an interface screen similar to the scheduled event graphical user interface screen 230 (FIG. 7). If the defer button 246 is selected, the device 10 will exit the dialog box 240 and defer the display of the reminder dialog box 240 to a specified time and/or date. Optionally, the device 10 will present a further date and time field for entry of this specified time and/or date. If the dismiss button 244 is selected, the device 10 will simply exit the reminder dialog box 240.

Figure 10:
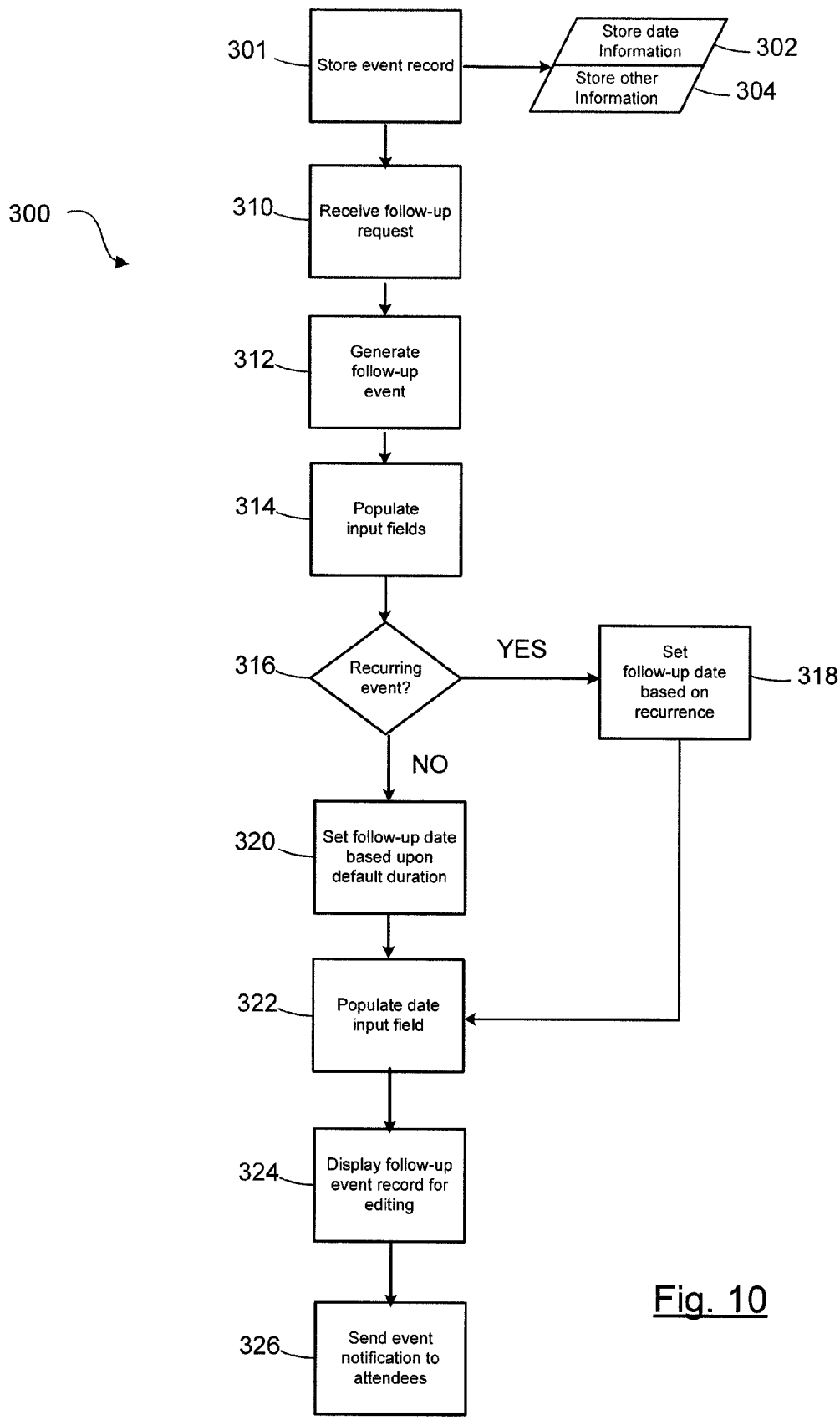
FIG. 10 shows an exemplary flowchart of an algorithm to be implemented by an event scheduler.

FIG. 10 shows an exemplary flowchart of a method 300 for scheduling a follow-up event. The exact order of steps may vary depending on the application. It can also be appreciated that some steps may not be required in some example embodiments.

In some example embodiments, the method 300 begins with storage of an event record in step 301. The event record may include date information 302 and other information 304. The event record may include a data object or other programming structure containing the date information 302 and other information 304 in a prescribed format. Date information 302 may include the date and/or time of the event. Examples of other information 304 may include the subject, the invited attendees, the event location, and any applicable notes.

In step 310, a request for a follow-up event is received in connection with the stored event record. As described above, various user interfaces and menus displayed in connection with the stored event record may offer a follow-up option. The request may, for example, result from a user selection of a follow-up button or item on a menu.

In step 312, the request results in creation or generation of a new record for the follow-up event. In some embodiments, this may include generation of a new object or other programming or data construct. The follow-up event record may have a prescribed structure similar to other events, like the stored event record. The prescribed structure may include a plurality of input fields, including date, time, attendees, subject, etc., fields. Many of these fields are populated in step 314 with the creation of the new follow-up record using data from the stored other information 304.

In step 316, the event scheduler 102 may determine whether the stored event record was configured to be a recurring event. If yes, then the event scheduler selects a follow-up date based upon the frequency of the recurrence, as indicated in step 318. The selected date is prior to the next occurrence of the recurring event. If no, then the event scheduler 102 selects a follow-up date based upon a default duration, shown as step 320. In either case, in step 322 the selected follow-up date is inserted in the date field of the new follow-up event record. The generated follow-up event record may be displayed to the user in a user interface to permit the user to adjust the attendees, date, time, subject, or any other details of the record, as indicated in step 324. The user interface provides a user input to indicate acceptance of the follow-up event record.

Once the user accepts the follow-up event record, then, in step 326, an event notification may be sent to the attendees. In some cases the attendees are invited to accept or decline the proposed follow-up event.

Step 318 involves the determination of an appropriate follow-up date based upon the frequency of the recurring series of events. For example, the existing event record may relate to a monthly recurring meeting; a follow-up date would be selected that occurs prior to the next monthly meeting. A number of algorithms of varying complexity may be used to select an appropriate follow-up date.

In one embodiment, the selection of the follow-up date in the case of a recurring event involves selecting between two or more predetermined time intervals based on the frequency of the recurrence, where the predetermined time interval represents the time interval added to the existing event date to arrive at the follow-up date. In other words, if the recurrence is infrequent, such as every six months or once a year, then the follow-up date may be based upon a predetermined time interval of one month from the existing event date. If the recurrence is more frequent, such as weekly, then the follow-up date may be based upon a predetermined time interval of a day or two from the existing event date. As an example, the following table of recurrence frequencies and their predetermined time intervals may be used:

| Frequency of Recurrence | Predetermined Time Interval |
| --- | --- |
| 6 months to 1 year | 1 month |
| 1 month to <6 months | 1 week |
| 1 week to <1 month | 2 days |
| <1 week | 1 day or Not available |

It will be appreciated that other mappings or correlations between frequency of recurrence and the time interval may be used, depending on the application. It will also be appreciated that the algorithm for selecting an appropriate follow-up date may take into account weekends, holidays, and other such factors.

In one embodiment, the selection of the follow-up date includes adding the time interval to the most recent date of the recurring event. In many cases the most recent date is the date associated with the occurrence in association with which the follow-up request was received. In some instances, the request to schedule the follow-up event may be received well after the occurrence of the most recent date of the recurring event. As a result, the step of selecting a follow-up date may include ensuring that the follow-up date determined using the interval time is after the current date. Alternatively, the follow-up date may be determined by adding the interval time to the current date instead of the most recent date of the existing event. In this case, if the current date is close to the next occurrence of the recurring event, then the follow-up date may be on or after the next occurrence. Accordingly, the step of selecting the follow-up date may include a test to ensure that the follow-up date does not fall on or after the next occurrence of the recurring event.

By way of example, the recurring event may include a monthly meeting, perhaps scheduled for the first Monday each month. During or shortly after one such meeting, one of the attendees may input a follow-up request with respect to the meeting, perhaps because of the need to complete discussion or deliberation regarding a time-sensitive matter. The event scheduler 102 may select a follow-up date based upon the monthly recurrence. In one embodiment, the event scheduler 102 may automatically select a date one week after the most recent Monday meeting, provided that the current date is not more than one week after the most recent Monday meeting. Alternatively, the event scheduler 102 may select a date one week after the current date, where the current date may, for example, be the same day or days after the meeting. In any case, the follow-up date is selected to be between the current date and the date of the next occurrence of the recurring meeting.

It should be understood that while in the above description, the entering of information, selection of items, and the like is performed using the device 10, it is equally possibly these tasks be performed using a computer, for example a conventional desktop computer, in communication with the device 10. Furthermore, the event scheduling described herein can be applied to communications devices other than mobile devices, including stationary computers that are configured to send and receive messages over a network.

While many of the foregoing embodiments relate to the scheduling of follow-up meetings having a plurality of attendees, it will be appreciated that the present application is not limited to events having a plurality of attendees, or events that specify any attendees. In some embodiments, the present application may be implemented with events having no identified "attendees", such as tasks or reminders.

While the invention has been described in detail in the foregoing specification, it will be understood by those skilled in the art that variations may be made without departing from the scope of the invention, being limited only by the appended claims.

What is claimed is:

1. A method for scheduling a future event on a device connected to a network, the device having stored thereon an existing event record, the existing event record having at least date information and subject information, the method being implemented by the device and comprising the steps of:
displaying a reminder screen on the device in relation to the existing event record at a defined duration prior to occurrence of the existing event record;
receiving on the reminder screen a user selectable option for scheduling a new follow-up event having the information extracted from the existing event record;
creating a follow-up event record, the follow-up event record having a plurality of fields, comprising a subject field and a date field;
extracting the subject information from the existing event record and populating the subject field with the extracted subject information;
determining whether the existing event record comprises an occurrence of a recurring event having a frequency of recurrence and a next occurrence of the recurring event and, if so, automatically selecting a follow-up date prior to the next occurrence of the recurring event and based upon said frequency of recurrence and if not, automatically selecting the follow-up date based upon said date of the existing event record plus a predetermined default interval stored in the device;
populating the date field with the selected follow-up date; and
displaying the follow-up event record in a scheduling user interface.

2. The method claimed in claim 1, wherein said step of selecting a follow-up date based upon said frequency of recurrence includes selecting the follow-up date based upon a date of the existing event record plus a time interval, and wherein said time interval is determined based upon said frequency of recurrence.

3. The method claimed in claim 2, wherein, if said frequency of recurrence is at least monthly, said time interval comprises one week, and wherein if said frequency of recurrence is less than monthly said time interval comprises more than one week.

4. The method claimed in claim 1, wherein said existing event record further includes attendee information, said follow-up event record includes an attendee field, and said steps of extracting and populating include extracting said attendee information from said existing event record and populating said attendee field with said extracted attendee information.

5. The method claimed in claim 4, further including a step of transmitting an event notification to each attendee identified in said attendee information regarding the follow-up event record.

6. The method claimed in claim 1, further including a step of displaying, in association with said existing event record, a selectable follow-up option, and wherein said step of receiving a request comprises receiving user selection of said follow-up option.

7. The method claimed in claim 1, wherein said step of displaying the follow-up record includes permitting user editing of the follow-up record, and receiving user acceptance of the follow-up record.

8. The method claimed in claim 1, wherein said selecting of said follow-up date uses a predetermined time interval correlation stored in the device based upon said frequency of recurrence, wherein said predetermined time interval correlation is stored in the device and which correlates between said frequency of recurrence and a predetermined time interval.

9. A communications device, comprising:
a memory storing an existing event record, the existing event record having at least date information and subject information;
a display;
a user input device;
a communications subsystem for communicating with remote devices over a network;
a processor for receiving input from the user input device and for controlling the display;
an event scheduler executable by the processor and configured to
display a reminder screen on the device in relation to the existing event record at a defined duration prior to occurrence of the existing event record,
display on the reminder screen a user selectable option for receiving a request to schedule a new follow-up event having the information extracted from the existing event record,
create a follow-up event record, the follow-up event record having a plurality of fields, including a subject field and a date field,
extract the subject information from the existing event record and populate the subject field with the extracted subject information,
determine whether the existing event record comprises an occurrence of a recurring event having a frequency of recurrence and a next occurrence of the recurring event and, if so, automatically select a follow-up date prior to the next occurrence of the recurring event and based upon said frequency of recurrence and if not, automatically select a the follow-up date based upon said date of the existing event record plus a predetermined default interval stored in the memory,
and
populate the date field with the selected follow-up date,
wherein said display is configured to display said follow-up event record in a scheduling user interface.

10. The communications device claimed in claim 9, wherein said event scheduler is configured to select the follow-up date based upon a date of the existing event record plus a time interval, and wherein said time interval is determined based upon said frequency of recurrence.

11. The communications device claimed in claim 10, wherein, if said frequency of recurrence is at least monthly, said time interval comprises one week, and wherein if said frequency of recurrence is less than monthly said time interval comprises more than one week.

12. The communications device claimed in claim 9, wherein said existing event record further includes attendee information, said follow-up event record includes an attendee field, and said event scheduler is configured to extract said attendee information from said existing event record and populate said attendee field with said extracted attendee information.

13. The communications device claimed in claim 12, wherein said communications subsystem is configured to transmit an event notification to each attendee identified in said attendee information regarding the follow-up event record.

14. The communications device claimed in claim 9, wherein said display is configured to display, in association with said existing event record, a selectable follow-up option, and wherein said selectable follow-up option is selectable using said user input device to generate said request to schedule.

15. The communications device claimed in claim 9, wherein said event scheduler is configured to permit user editing of the follow-up record via said user interface, and to receive user acceptance of the follow-up record.

16. The device claimed in claim 9, wherein said selection of said follow-up date uses a predetermined time interval correlation stored in the device based upon said frequency of recurrence, wherein said predetermined time interval correlation is stored in the device and which correlates between said frequency of recurrence and a predetermined time interval.

17. A computer program product comprising a non-transitory computer-readable medium having encoded thereon computer program instructions for scheduling a future event on a device connected to a network, the device having stored thereon an existing event record, the existing event record having at least date information, attendee information, and subject information, the computer executable instructions comprising instructions for:

displaying a reminder screen on the device in relation to the existing event record at a defined duration prior to occurrence of the existing event record;
 receiving on the reminder screen a user selectable option for scheduling a new follow-up event having the information extracted from the existing event record;
 creating a follow-up event record, the follow-up event record having a plurality of fields, including an attendee field, a subject field, and a date field;
 extracting the attendee information and subject information from the existing event record and populating the attendee field and the subject field with the extracted attendee information and subject information, respectively;
 determining whether the existing event record comprises an occurrence of a recurring event having a frequency of recurrence and a next occurrence of the recurring event and, if so, automatically selecting a follow-up date prior to the next occurrence of the recurring event and based upon said frequency of recurrence and if not, automatically selecting the follow-up date based upon said date of the existing event record plus a predetermined default interval stored in the device;
 populating the date field with the selected follow-up date; and
 displaying the follow-up event record in a scheduling user interface.

\* \* \* \* \*